UNITED STATES PATENT OFFICE.

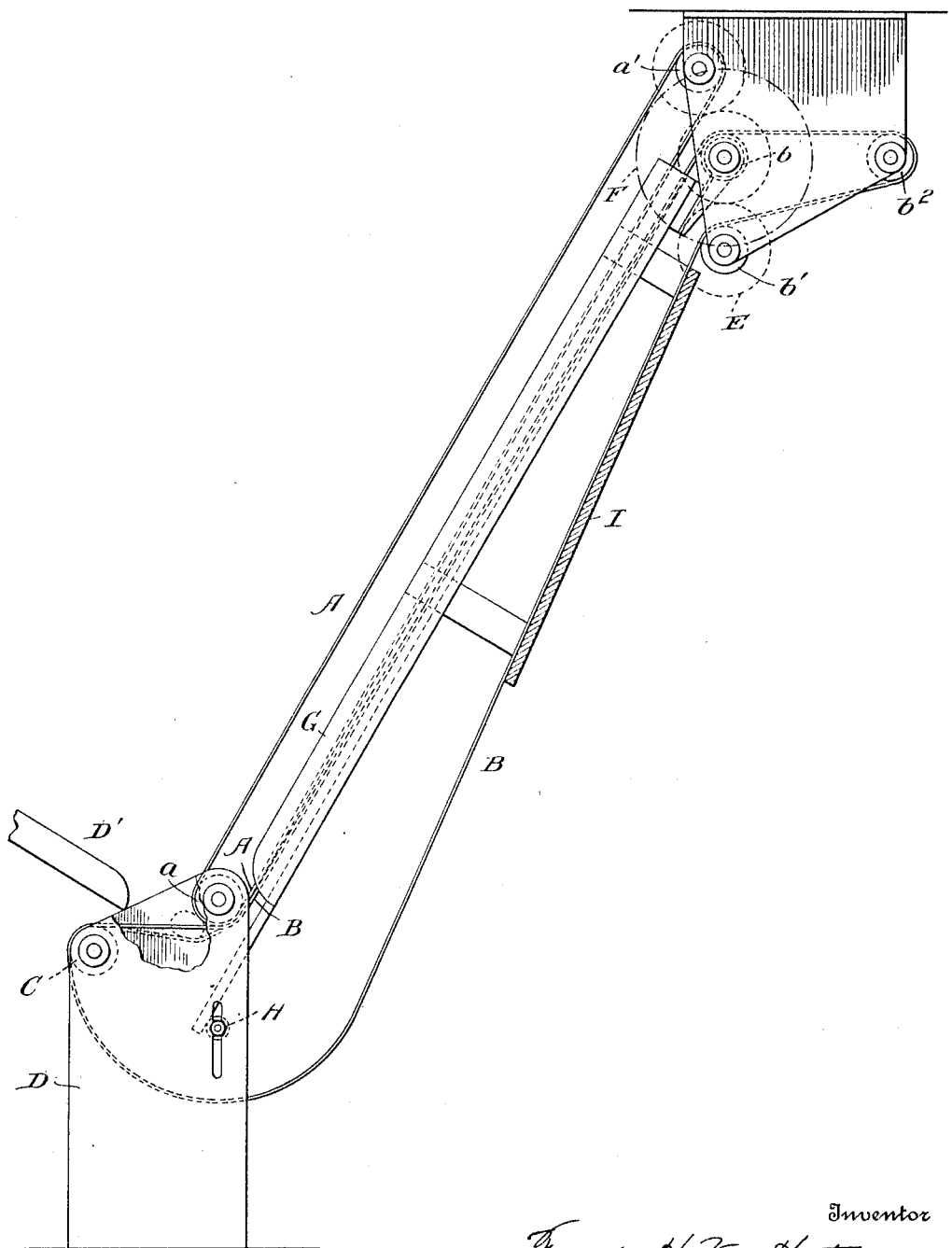

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-HANDLING MACHINERY.

1,119,205. Specification of Letters Patent. Patented Dec. 1, 1914.

Application filed February 20, 1913. Serial No. 749,673.

*To all whom it may concern:*

Be it known that I, FRANK H. VAN HOUTEN, a citizen of the United States, and resident of Fishkill-on-the-Hudson, in the county of Dutchess and State of New York, have invented certain new and useful Improvements in Dough-Handling Machinery; and I do hereby declare the following to be a full, clear, and exact description of the same, reference being had to the accompanying drawings, forming part of this specification, and to the figures and letters of reference marked thereon.

This invention relates to dough handling machinery and is particularly designed as an improvement upon apparatus heretofore used for removing the measured portions or lumps of dough delivered from a dividing or balling machine, and conveying the same to a proofing cabinet. Apparatus designed for performing this function, as heretofore used, has been defective in that under certain circumstances the removal of the delivered lumps or portions of dough was not sufficiently certain and quick enough to prevent adjacent or succeeding portions from contacting and coalescing and thereby causing either a complete interruption in the operation, or delivering portions of dough of impractical size.

In accordance with the present invention, provision is made whereby the lumps of dough delivered from the dividing or balling machine, are each separately advanced at once to the conveying apparatus and presented thereto in a positive manner so as to prevent any lagging or retardation in the movement of the several individual lumps from any cause whatsoever.

The invention consists in certain novel details of construction and combinations and arrangements of parts, all as will be now described and pointed out particularly in the appended claims.

The accompanying drawing is a side elevation, partly in section, of an apparatus embodying the present improvement.

Generally speaking, the apparatus of the present invention embodies conveyer belts mounted in inclined position, with proximate reaches, between suitable guide pulleys, forming a channel in which the dough is gripped and carried from a lower to a higher level for delivery to the proofing cabinet.

Referring to the drawings, the upper belt A is shown as guided by a roller $a$ at the bottom and a roller $a'$ at the top, while the belt B at the top of the apparatus passes around driven rollers $b$ and $b'$ in opposite directions, and around an intermediate idler roller $b^2$ preferably located horizontally beyond the roller $b$ so as to form a substantially horizontal reach of the belt B on which the lumps of dough will be carried away from the elevator and delivered to the cabinet. At the lower end of the apparatus the belt B is deflected around the pulley $a$ and is guided by a roller C journaled in the frame D a short distance in front of the roller $a$, thereby forming at the bottom of the apparatus a forwardly extending reach of the lower belt on which the lumps of dough may be delivered or deposited from the trough or chute D leading from the dough divider or balling machine. The reach of the belt extending down from the roller C and up to the roller $b'$ is preferably loose and hangs in the form of a loop, the weight of which is sufficient to normally keep the upper reach of the belt in contact with the belt A and roller $a$, but allows said upper reach of the belt to separate from the belt A and roller $a$ when a lump of dough is entered between the belts. The belts are all driven, as before stated, through the rollers at the upper end of the apparatus and, conveniently, said rollers are connected together by gearing, indicated by the dotted lines E, the shaft of one of the rollers being provided with a belt pulley indicated by the dotted line F.

The proximate reaches of the belts forming between them the channel in which the lumps of dough are carried, preferably travel through a trough G which will support the lower belt against sagging under the weight of the lumps of dough to a point where the gripping action will be ineffective, but at the same time permits of sufficient play to prevent binding or injurious deformation of the lumps. Conveniently, the trough G is hinged at the upper end to the shafts or bearings of the roller $b$ and at the lower end rests on an adjustable support H whereby the distance between the bottom of the trough and the roller $a$ and upper belt may be regulated, as required. The pendent reach of the belt B is also conveniently supported by a hanger or guide I carried by the trough G so as to keep the apparatus in a small compass and prevent the belt from catching neighboring objects.

In operation the lumps of dough are delivered successively from the chute D to the lower substantially horizontal reach of the belt B and by the latter are immediately advanced into the bight at the entrance end of the two belts. Ordinarily, the weight of the dough will not cause the horizontal reach of the belt to sag sufficiently to interfere with its effective operation, but should it, for any reason, do so, the lower end of the bottom of the trough G extends sufficiently below the roller $a$ to afford a support for the belt B and force the lump of dough to enter properly between the belts.

The two belts preferably travel at the same surface speed and the speed of movement is made fast enough to insure the removal of each deposited lump of dough before the next succeeding lump can possibly contact therewith, thus the lumps are kept entirely separate and distinct from each other.

Having thus described my invention, what I claim as new, and desire to secure by Letters Patent, is,—

1. A dough handling apparatus embodying independent, disconnected endless belts having proximate inclined reaches forming a passage in which the lumps of dough are gripped and carried, driving and guide rollers for one of said belts located respectively at the upper and lower ends of the apparatus and between which said belt extends in substantially straight reaches, guide and drive rollers for the lower belt at the opposite ends of the apparatus, the guide roller for the lower belt at the lower end of the apparatus being located forwardly of the guide roller for the upper belt whereby the lower belt is deflected around the guide roller for the upper belt and forms a substantially horizontal receiving reach, said lower belt having its return reach from the upper to the lower end of the apparatus in the form of a pendent loop, the weight of which maintains the tension on the substantially horizontal receiving reach.

2. In a dough handling apparatus, such as described, the combination with the independent, disconnected elevating belts having proximate reaches forming between them a channel in which the dough is gripped and carried, a guide roller for the lower belt located forwardly of the lower guide roller for the upper belt, a trough in which the proximate reaches of said belt travel, pivotally supported at its upper end and adjustable at its lower end toward and from the proximate reaches of the belt.

FRANK H. VAN HOUTEN.

Witnesses:
J. E. VAN HOUTEN,
ANNA F. DEVEREAUX.